(12) United States Patent
Hashimoto

(10) Patent No.: US 8,660,730 B2
(45) Date of Patent: Feb. 25, 2014

(54) VEHICLE AND METHOD FOR ENERGIZING CATALYST DEVICE

(75) Inventor: Keita Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/392,665

(22) PCT Filed: Mar. 10, 2010

(86) PCT No.: PCT/JP2010/053938

§ 371 (c)(1),
(2), (4) Date: Feb. 27, 2012

(87) PCT Pub. No.: WO2011/111176

PCT Pub. Date: Sep. 15, 2011

(65) Prior Publication Data

US 2012/0323419 A1    Dec. 20, 2012

(51) Int. Cl.
*F01N 3/20* (2006.01)
*B60W 10/08* (2006.01)
*B60W 10/26* (2006.01)
*B60W 20/00* (2006.01)

(52) U.S. Cl.
USPC .......................... 701/22; 180/65.1; 180/65.21

(58) Field of Classification Search
USPC ................................ 701/22; 180/65.1, 65.21
See application file for complete search history.

(56) References Cited

U.S. PATENT DOCUMENTS

2012/0004801 A1    1/2012  Watanabe

FOREIGN PATENT DOCUMENTS

| JP | 05-115796 A | * | 5/1993 | ............... B01J 35/04 |
|---|---|---|---|---|
| JP | A-05-288043 | | 11/1993 | |
| JP | A-09-158718 | | 6/1997 | |
| JP | A-11-210448 | | 8/1999 | |
| JP | A-2003-227366 | | 8/2003 | |
| JP | 2008-239078 A | * | 10/2008 | ............ B60W 10/06 |
| JP | A-2008-239078 | | 10/2008 | |
| JP | A-2009-082873 | | 4/2009 | |
| JP | A-2010-223159 | | 10/2010 | |

OTHER PUBLICATIONS

International Search Report issued in International Application No. PCT/JP2010/053938 dated Jun. 1, 2010.

* cited by examiner

*Primary Examiner* — Mary Cheung
*Assistant Examiner* — Brian P Sweeney
(74) *Attorney, Agent, or Firm* — Oliff PLC

(57) ABSTRACT

A vehicle includes: a catalyst device configured to be electrically heatable for purifying exhaust gas of an internal combustion engine; a first temperature detection unit for detecting the temperature of the catalyst device; a state-of-charge detection unit for detecting the state of charge of a power storage device; a second temperature detection unit for detecting the temperature of the power storage device; a catalyst power supply device supplying the catalyst device with electric power for heating it; and a controller. The controller calculates first electric power that the power storage device can supply based on the state of charge of the power storage device and an output of the second temperature detection unit, and the controller determines according to an output of the first temperature detection unit whether to cause the catalyst power supply device to supply the catalyst device with the first electric power.

6 Claims, 5 Drawing Sheets

VEHICLE AND METHOD FOR ENERGIZING CATALYST DEVICE

TECHNICAL FIELD

The present invention relates generally to a vehicle and a method for energizing a catalyst device, and particularly to a vehicle having a catalyst device mounted therein and configured to be electrically heatable for purifying the exhaust gas of the internal combustion engine of the vehicle, and a method for energizing the catalyst device of the vehicle.

BACKGROUND ART

Generally, a vehicle having an internal combustion engine mounted therein is provided with a catalyst device to purify exhaust gas. The catalyst device does not demonstrate its effect unless it is heated to some extent, and accordingly, it is disposed near the internal combustion engine so that it is heated immediately.

However, immediately after the internal combustion engine has just started, i.e., when the catalyst device is still not warm, its purification effect is insufficient. A hybrid vehicle or a similar vehicle having a traveling motor mounted therein has a possibility that it may repeat starting and stopping the internal combustion engine, as required, while it travels. This results in more occasions to start the internal combustion engine while the catalyst device is not warm, and the vehicle may emit exhaust gas containing carbon monoxide, hydrocarbon and the like for increased periods of time.

Accordingly, using electric power to warm the catalyst device before starting the internal combustion engine, is considered. Such a catalyst device is also referred to as an electrically heated catalyst (EHC).

Japanese Patent Laying-Open No. 11-210448 (PTL 1) discloses a hybrid vehicle having an EHC mounted therein.

CITATION LIST

Patent Literatures

PTL 1: Japanese Patent Laying-Open No. 11-210448
PTL 2: Japanese Patent Laying-Open No. 2009-82873
PTL 3: Japanese Patent Laying-Open No. 2003-227366

SUMMARY OF INVENTION

Technical Problem

The EHC includes an EHC with a catalyst provided with an electric heater, an EHC having a catalyst per se energized to generate heat, and the like.

Hybrid vehicles and similar vehicles having a battery of high voltage and large capacity are required to have a portion that is supplied with the high voltage battery's voltage electrically insulated from the vehicle's body earth. However, the vehicle has an exhaust pipe coupled with the body earth, and it is thus difficult to ensure that a heater, a catalyst and the like of an EHC accommodated in the exhaust pipe receive voltage from the high voltage battery while they are electrically insulated from the exhaust pipe.

In particular, the EHC is supported by a member formed of insulator, which has volume resistivity varying with temperature, and for high temperature, the member's resistance decreases, and accordingly, its influence must be considered sufficiently.

An object of the present invention is to provide a vehicle equipped with an EHC driven by a high voltage battery and a method of energizing a catalyst device.

Solution to Problem

In summary, the present invention provides a vehicle including: an internal combustion engine; a catalyst device configured to be electrically heatable for purifying the exhaust gas of the internal combustion engine; a first temperature detection unit for detecting the temperature of the catalyst device; a power storage device; a state-of-charge detection unit for detecting a state of charge of the power storage device; a second temperature detection unit for detecting the temperature of the power storage device; a catalyst power supply device receiving electric power from the power storage device and supplying the catalyst device with electric power for heating the catalyst device; and a controller controlling the catalyst power supply device. The controller calculates first electric power that the power storage device can supply based on the state of charge of the power storage device and an output of the second temperature detection unit, and the controller determines according to an output of the first temperature detection unit whether to cause the catalyst power supply device to supply the catalyst device with the first electric power.

Preferably, if the first temperature detection unit detects that the catalyst device has temperature lower than a threshold value, the controller causes the catalyst power supply device to supply the catalyst device with the first electric power, and if the catalyst device has temperature higher than the threshold value, the controller causes the catalyst power supply device to supply the catalyst device with a voltage that can ensure insulation of an insulator holding the catalyst device, and electric power limited to be smaller than the first electric power.

More preferably, if the catalyst device has temperature higher than the threshold value, the controller causes the catalyst power supply device to supply the catalyst device with a voltage equal to or smaller than a predetermined value.

Preferably, after starting to heat the catalyst device while the first temperature detection unit detects that the catalyst device has temperature lower than a threshold value, the controller controls the catalyst power supply device to supply the catalyst device with target electric power, and once the catalyst device has attained temperature exceeding the threshold value, the controller controls the catalyst power supply device to supply the catalyst device with target voltage.

Preferably, the catalyst device includes a heating element energized to generate heat, and the controller estimates a value in resistance of the heating element from an output of the first temperature detection unit and determines electric power output from the power storage device for energization in accordance with the estimated value.

Preferably, the vehicle further includes a motor for causing the vehicle to travel, and a motor drive unit for driving the motor, and the power storage device supplies electric power to the motor drive unit.

Advantageous Effects of Invention

The present invention thus ensures that an EHC mounted in a vehicle and driven with electric power output from a high voltage battery is insulated from the vehicle's body.

DESCRIPTION OF EMBODIMENTS

Hereinafter reference will be made to the drawings to describe the present invention in embodiments. In the figures, identical or corresponding components are identically denoted and will not be described repeatedly in detail.

Figure 1:
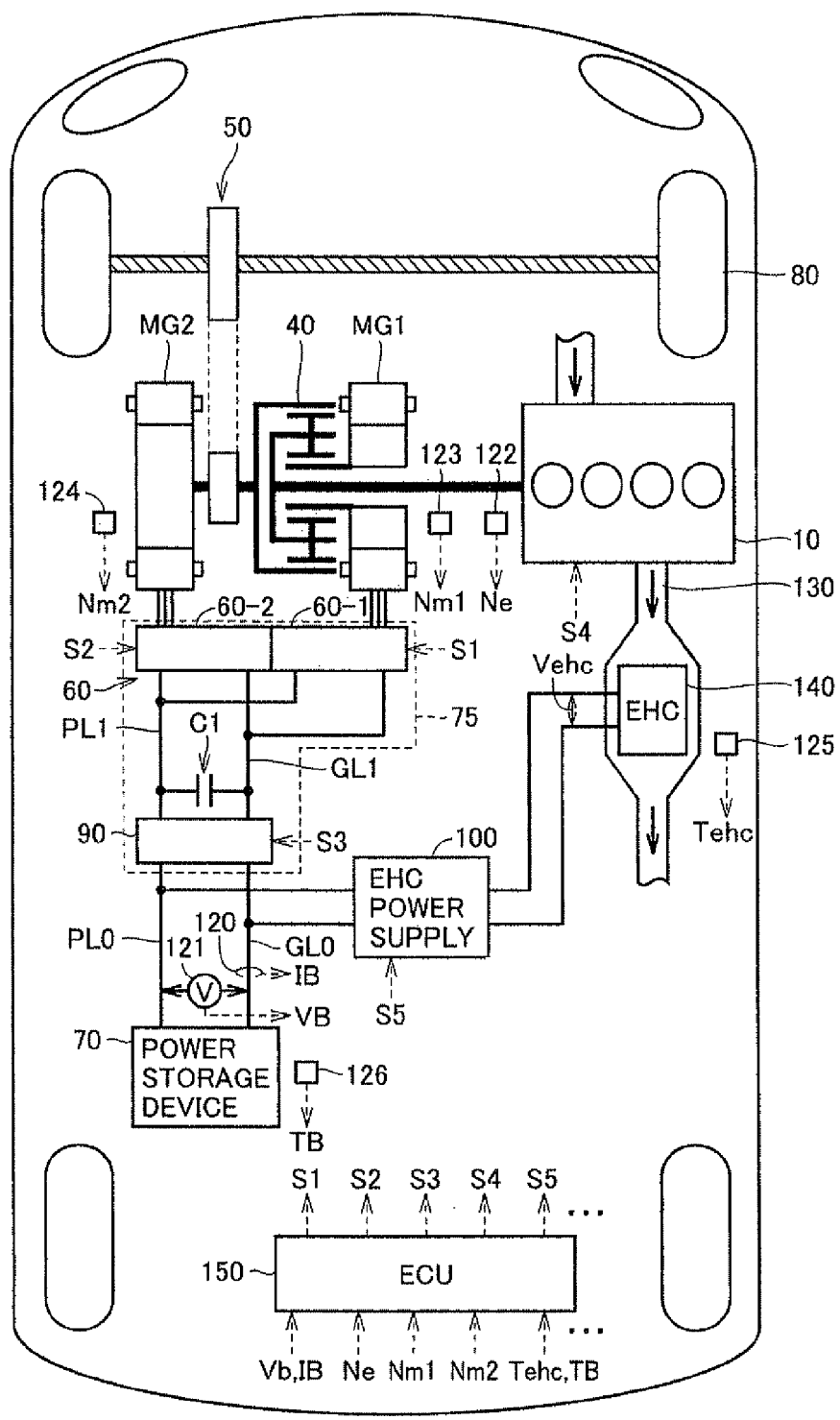
FIG. 1 is a general block diagram of a hybrid vehicle according to an embodiment of the present invention.

FIG. 1 is a general block diagram of a hybrid vehicle according to an embodiment of the present invention.

With reference to FIG. 1, a hybrid vehicle 1 includes an engine 10, a motor generator MG1, a motor generator MG2, a power split device 40, a speed reducer 50, and a driving wheel 80.

Engine 10 is an internal combustion engine which generates driving force rotating a crankshaft with combustion energy produced when a mixture of air introduced into a combustion chamber and fuel is burnt.

Motor generator MG1 and motor generator MG2 are alternating current motors, and they are for example three-phase alternating-current synchronous motors.

Hybrid vehicle 1 travels with driving force output from at least one of engine 10 and motor generator MG2. The driving force generated by engine 10 is divided into two paths by power split device 40. That is, one is a path transmitting driving force to driving wheel 80 via speed reducer 50, and the other is a path transmitting driving force to motor generator MG1.

Power split device 40 includes a planetary gear configured of a sun gear, a pinion gear, a carrier, and a ring gear. The pinion gear engages with the sun gear and the ring gear. The carrier supports the pinion gear rotatably and is also coupled with the crankshaft of engine 10. The sun gear is coupled with the axis of rotation of motor generator MG1. The ring gear is coupled with the axis of rotation of motor generator MG2 and speed reducer 50.

Engine 10, motor generator MG1 and motor generator MG2, coupled with one another via power split device 40, rotate at rates having a relationship connected by a straight line in a nomographic chart.

Hybrid vehicle 1 further includes a motor drive unit 75. Motor drive unit 75 includes an inverter 60, a smoothing capacitor C1, a voltage converter 90, and a power storage device 70.

Inverter 60 controls driving motor generator MG1 and motor generator MG2. Motor generator MG1 generates electric power by using the motive power of engine 10 divided by power split device 40. The electric power generated by motor generator MG1 is converted from an alternating current to a direct current by inverter 60, and stored to power storage device 70.

Motor generator MG2 generates driving force using at least one of the electric power stored in power storage device 70 and the electric power generated by motor generator MG1. The driving force of motor generator MG2 is transmitted to driving wheel 80 via speed reducer 50. Note that while FIG. 1 shows driving wheel 80 as a front wheel, a rear wheel in place of or together with the front wheel may be driven by motor generator MG2.

Note that when the vehicle is braked, motor generator MG2 is driven by driving wheel 80 via speed reducer 50, and motor generator MG2 operates as a power generator. Thus, motor generator MG2 also functions as a regeneration brake converting the vehicle's kinetic energy to electric power. The electric power generated by motor generator MG2 is stored to power storage device 70.

Power storage device 70 can for example be a lead battery, a nickel metal hydride battery, a lithium ion battery or a similar secondary battery, an electric double layer capacitor or a similar larger capacity capacitor, or the like.

Inverter 60 includes an inverter 60-1 and an inverter 60-2. Inverter 60-1 and inverter 60-2 are connected to voltage converter 90 in parallel.

Inverter 60-1 is provided between voltage converter 90 and motor generator MG1. Inverter 60-1 operates in response to a control signal S1 received from an electronic control unit (ECU) 150 to control driving motor generator MG1.

Inverter 60-2 is provided between voltage converter 90 and motor generator MG2. Inverter 60-2 operates in response to a control signal S2 received from ECU 150 to control driving motor generator MG2.

Voltage converter 90 performs voltage conversion between power storage device 70 and inverter 60. Voltage converter 90 boosts the voltage of power storage device 70 (more precisely, a voltage between a power supply line PL0 and a ground line GL0) to attain a target voltage value indicated by a control signal S3 received from ECU 150. Thus, the voltage of power supply line PL1 and ground line GL0 (hereinafter also referred to as "direct current voltage VH associated with high voltage" or simply "voltage VH") is controlled to attain the target voltage value indicated by control signal S3.

Smoothing capacitor C1 is connected between power supply line PL1 and ground line GL1. Smoothing capacitor C1 smoothes direct current voltage VH associated with high voltage.

Engine 10 emits exhaust gas which is in turn passed through an exhaust path 130 and discharged into the air. Exhaust path 130 has an intermediate portion provided with an electrically heating catalyst (EHC) 140.

EHC 140 is configured to electrically heat a catalyst purifying exhaust gas. EHC 140 is connected to an EHC power supply 100 to receive electric power to heat the catalyst. Note that various known EHCs are applicable to EHC 140.

EHC power supply 100 is provided between EHC 140 and power storage device 70. EHC power supply 100 is connected to power storage device 70 in parallel with voltage converter 90. EHC power supply 100 operates in response to a control signal S5 received from ECU 150 to adjust electric power supplied from power storage device 70 to EHC 140. For example, when EHC 140 has a temperature Tehc lower than a prescribed temperature and has purification power lower than a target level, ECU 150 controls EHC power supply 100 to supply electric power from power storage device 70 to EHC 140. Thus, EHC 140 is driven and the catalyst provided in EHC 140 is heated, and EHC 140 can thus exhibit enhanced purification power.

EHC power supply 100 can operate in response to control signal S5 to vary voltage supplied to EHC 140. EHC power supply 100 is configured for example to supply a voltage (for example of 200V) of power storage device 70 as it is or supply the voltage of power storage device 70 that has been down-converted (for example to 50-60 V).

Furthermore, hybrid vehicle 1 further includes a current sensor 120, a voltage sensor 121, rotational speed sensors 122, 123, 124, and temperature sensors 125 and 126.

Voltage sensor 121 measures voltage VB between the terminals of power storage device 70. Temperature sensor 126 senses temperature TB of power storage device 70. Current sensor 120 senses electric current IB flowing to power storage device 70 to monitor the state of charge (SOC) of power storage device 70 together with voltage sensor 121.

Rotational speed sensors 122, 123, 124 sense rotational speed Ne of engine 10, rotational speed Nm1 of motor generator MG1, and rotational speed Nm2 of motor generator MG2, respectively. Temperature sensor 125 senses temperature Tehc of EHC 140. These sensors transmit detection results to ECU 150.

ECU 150 is configured to incorporate a central processing unit (CPU) and memory (not shown) therein and operate in accordance with a map and a program stored in the memory to perform a predetermined operation process. Alternatively, ECU 150 may be configured to have at least a portion configured to perform a predetermined numerical/logical operation process by an electronic circuit or similar hardware.

ECU 150 operates in accordance with the information of each sensor and the like to generate control signals S1-S5 mentioned above, and outputs the generated control signals S1-S5 to each component. For example, ECU 150 operates in accordance with the information of each sensor and the like to set a torque command value Tgcom for motor generator MG1 and a torque command value Tmcom for motor generator MG2 and generates control signal S1 causing a torque Tg of motor generator MG1 to match torque command value Tgcom and control signal S2 causing a torque Tm of motor generator MG2 to match torque command value Tmcom and outputs control signals S1 and S2 to inverter 60-1 and inverter 60-2, respectively. Furthermore, ECU 150 sets a command value for an amount of fuel injected for engine 10 in accordance with the information of each sensor and the like, generates a control signal S4 causing an amount of fuel actually injected for engine 10 to match the command value, and outputs the signal to engine 10.

Figure 2:
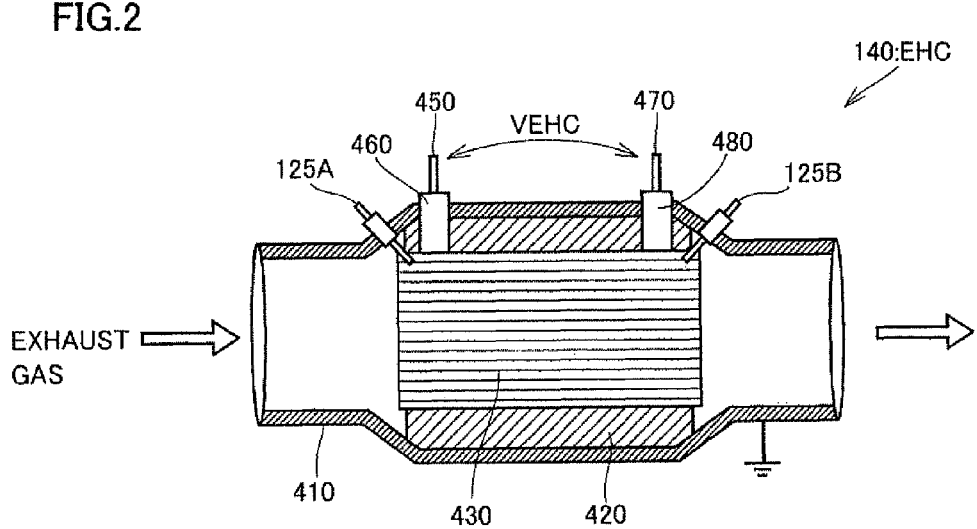
FIG. 2 is a cross section schematically showing a configuration of an EHC 140 in a direction in which an exhaust pipe shown in FIG. 1 extends.

FIG. 2 is a cross section schematically showing a configuration of EHC 140 in a direction in which an exhaust pipe shown in FIG. 1 extends.

With reference to FIG. 2, EHC 140 is configured including a casing 410, an insulating member 420, an EHC carrier 430, temperature sensors 125A and 125B, a positive electrode 450, a positive electrode coating 460, a negative electrode 470, and a negative electrode coating 480. EHC 140 is an example of an electrically heating catalyst device.

Casing 410 is a casing provided for EHC 140 and configured for example of stainless steel or similar metallic material and has its upstream and downstream ends connected via a coupling member (not shown) to exhaust path 130 of FIG. 1.

Insulating member 420 is provided to cover an inner circumferential surface of casing 410 and provides thermal insulation and electrical insulation. Insulating member 420 is implemented for example as alumina or similar insulating material.

EHC carrier 430 is an electrically conductive catalyst carrier having a honeycomb cross section orthogonal to the direction of the exhaust gas. Note that a carrier refers to a substance used as a foundation to fix (or carry) a substance exhibiting adsorption, catalytic activity and the like. EHC carrier 430 carries an oxidation catalyst (not shown), configured to be capable of purifying exhaust gas passing through EHC 430, as appropriate. Note that the catalyst carried by EHC carrier 430 may be a three-way catalyst.

Positive electrode 450 is an electrode having one end fixed adjacent to an end of EHC carrier 430 upstream of exhaust gas for applying positive voltage. Positive electrode 450 has the other end connected to EHC power supply 100 of FIG. 1. Note that positive electrode 450 is partially covered with positive electrode coating 460 of resin providing electrical insulation, and casing 410 and positive electrode 450 are thus electrically insulated from each other.

Upstream temperature sensor 125A is disposed at a portion of EHC carrier 430 adjacent to positive electrode 450 and configured to be capable of sensing the temperature of that portion. Upstream temperature sensor 125A is electrically connected to ECU 150 of FIG. 1, and the temperature sensed by the sensor is referenced by ECU 150 periodically or non periodically.

Negative electrode 470 is an electrode having one end fixed adjacent to an end of EHC carrier 430 downstream of exhaust gas for supplying a reference potential. Negative electrode 470 has the other end connected to EHC power supply 100 of FIG. 1. Note that negative electrode 470 is partially covered with negative electrode coating 480 of resin providing electrical insulation, and casing 410 and negative electrode 470 are thus electrically insulated from each other.

Downstream temperature sensor 125E is disposed at a portion of EHC carrier 430 adjacent to negative electrode 470 and configured to be capable of sensing the temperature of that portion. Downstream temperature sensor 125B is electrically connected to ECU 150, and the temperature sensed by the sensor is referenced by ECU 150 periodically or non periodically.

In EHC 140 thus configured, when positive voltage is applied to positive electrode 450 with the electric potential of negative electrode 470 serving as a reference, an electric current flows through electrically conductive EHC carrier 430, and EHC carrier 430 generates heat. The heat promotes raising the temperature of the oxidation catalyst carried by EHC carrier 430, and EHC 140 rapidly transitions to a catalytically active state.

Note that such a configuration of EHC 140 is only an example, and the EHC carrier's configuration, each electrode's arrangement and how it is controlled, and the like may be a variety of known manners.

Herein, EHC 140 has EHC carrier 430 formed with a material having a relatively large electric resistance (e.g., ceramics) in order to sufficiently secure its heat capacity. In order to cause EHC carrier 430 of a large heat mass to sufficiently generate heat, with the EHC at low temperature, there is a tendency that voltage applied is inevitably increased, and accordingly, EHC 140 is set to be driven on a relatively high voltage of approximately 200 V when it is normally driven to warm the catalyst with electric power received from EHC power supply 100 with the FIG. 1 power storage device 70 serving as an electric power source.

Furthermore, EHC power supply 100 of FIG. 1 is electrically connected to the positive and negative electrodes of EHC 140, and is configured to be capable of supplying positive electrode 450 with a direct-current drive voltage Vehc. In EHC carrier 430, a drive current Iehc corresponding to direct-current drive voltage Vehc is generated, and EHC carrier 430 generates heat corresponding to a quantity of heat generated by drive current Iehc and electric resistance Rehc of EHC carrier 430. Note that EHC power supply 100 of FIG. 1 includes a DC-DC converter, and is configured to be capable of supplying as direct-current drive voltage Vehc not only the high voltage of 200 V that is the aforementioned normal drive voltage but also a low voltage of 50 V or lower. This type of upconversion and downconversion function is also controlled by ECU 150.

Figure 3:
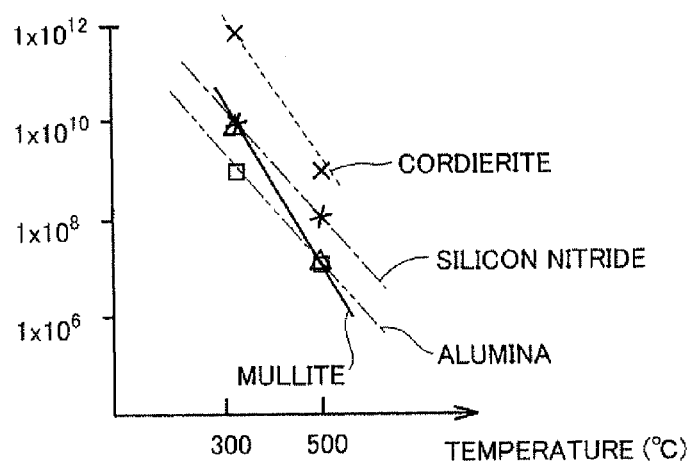
FIG. 3 is a diagram for illustrating how a variety of substances having a possibility of being used as a material for an insulating member 420 vary in volume resistivity with temperature.

FIG. 3 is a diagram for illustrating how a variety of substances having a possibility of being used as a material for insulating member 420 vary in volume resistivity with temperature.

With reference to FIG. 3, the axis of abscissa represents temperature (° C.) and the axis of ordinate represents volume resistivity (ohm·m). Alumina (aluminum oxide: $Al_2O_3$), silicon nitride ($Si_3N_4$), mullite (a compound of aluminum oxide and silicon dioxide), and cordierite ($Mg_2Al_3$ ($AlSi_5O_{18}$)) all decrease in volume resistivity by approximately two digits when temperature rises from 300° C. to 500° C.

As such, for high temperature of approximately 500° C., insulating member 420 decreases in resistance, and it is difficult to ensure electrical insulation between casing 410 of FIG. 2 generally grounded to the body earth and EHC carrier 430.

When the EHC is driven at or above high voltage (60 V), it is desirable that there is large insulation resistance between the EHC and the body earth in view of safety for high voltage. However, high temperature decreases the value in resistance of insulating member 420 insulating EHC carrier 430 from casing 410.

Accordingly, in the present embodiment, when temperature is low and insulating member 420 has a sufficiently large value in resistance, a high voltage exceeding 60 V is applied to heat the EHC carrier early. When temperature is high and insulating member 420 has a reduced value in resistance, a voltage smaller than 60 V is applied to maintain or slowly raise the EHC carrier's temperature.

Figure 4:
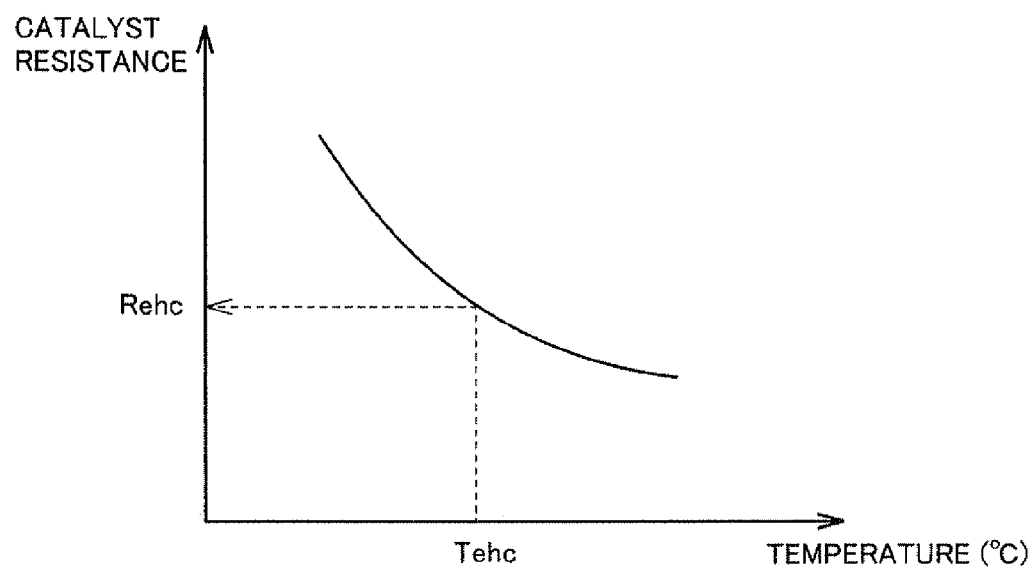
FIG. 4 is a diagram for illustrating how catalyst resistance varies with temperature.

FIG. 4 is a diagram for illustrating how catalyst resistance varies with temperature.

With reference to FIG. 4, the axis of abscissa represents temperature (° C.) and the axis of ordinate represents catalyst resistance (resistance Rehc of EHC carrier 430). If such data is previously obtained and stored in ECU 150, measuring the EHC's temperature Tehc allows obtaining a resistance value. Thus, sensing one of voltage and current allows expecting a quantity of heat generated at EHC430.

Figure 5:
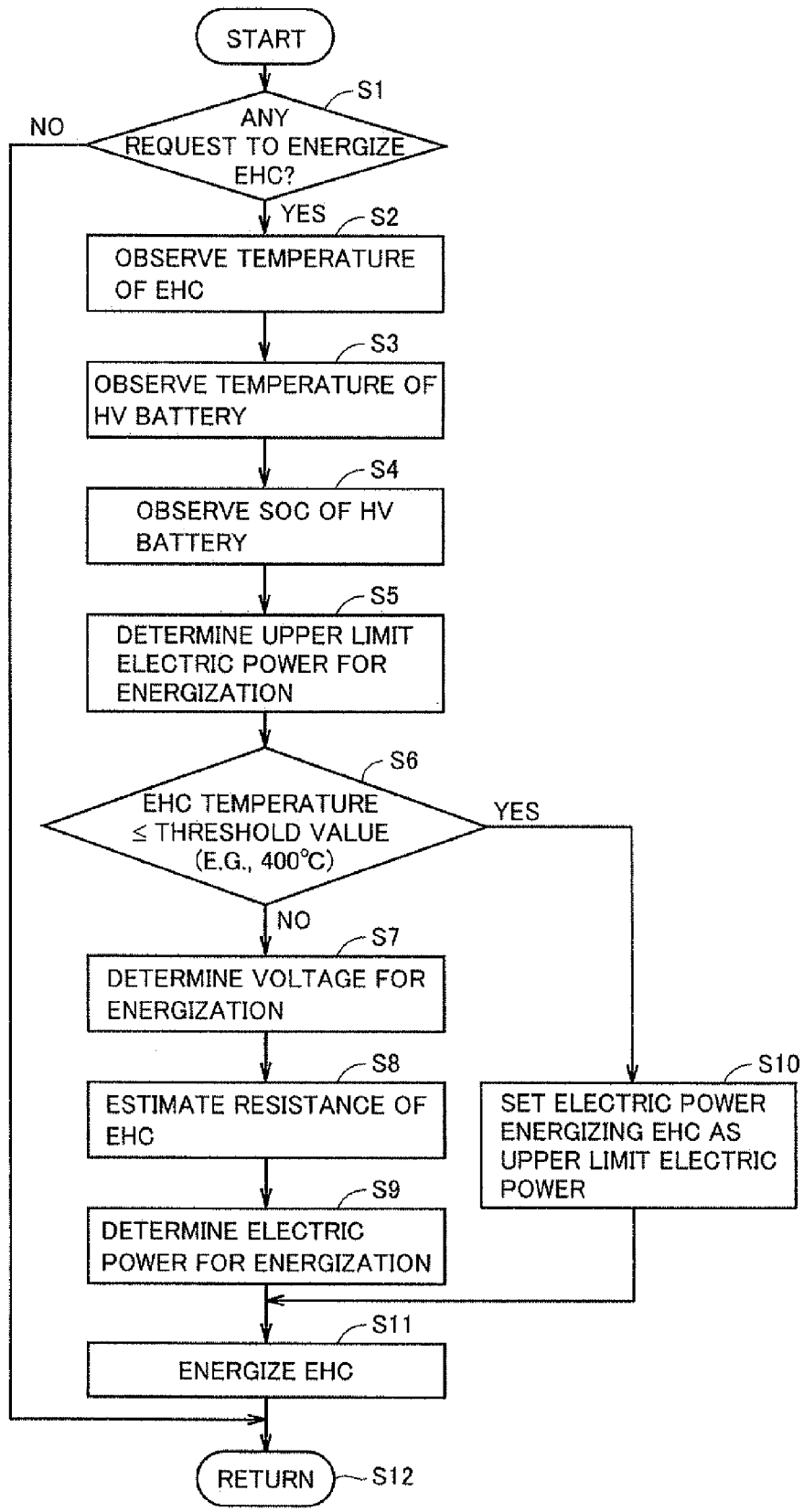
FIG. 5 is a flowchart for illustrating how energizing the EHC is controlled in the present embodiment.

FIG. 5 is a flowchart for illustrating how energizing the EHC is controlled in the present embodiment. This flowchart represents a process performed, called from a predetermined main routine whenever a predetermined period of time elapses or a predetermined condition is established.

With reference to FIG. 1 and FIG. 5, the process starts, and in Step S1 whether there is a request to energize the EHC is determined. This request is generated for example when it is necessary to operate engine 10. If there is no such request in Step S1, the control proceeds to Step S12 and returns to the main routine.

If in Step S1 there is a request to energize the EHC, the control proceeds to Step S2. At Step S2, ECU 150 obtains temperature Tehc of the EHC sensed by temperature sensor 125.

Then, in Step S3, ECU 150 obtains temperature TB of the hybrid battery (power storage device 70) sensed by temperature sensor 126. Then, in Step S4, ECU 150 observes the state of charge (SOC) of the hybrid battery. The SOC of the hybrid battery is normally calculated from voltage VB sensed by voltage sensor 121 and electric current IB sensed by current sensor 120. This calculation may be performed by an ECU dedicated to the battery or by ECU 150 per se.

Then, in Step S5, ECU 150 determines an upper limit electric power for energization Wout. ECU 150 for example operates in accordance with a map having the battery's SOC and temperature TB as parameters to calculate outputtable power and calculates a product of the calculated outputtable power and a deterioration factor as the upper limit electric power for energization Wout. Note that the upper limit electric power for energization Wout may be calculated in manners different than the above.

In Step S6, it is determined whether temperature Tehc sensed in Step S2 is equal to or lower than a threshold value. This threshold value is set for example at 400° C. Note that this threshold value is appropriately set based on how the insulating member shown in FIG. 2 varies in resistance with temperature.

In Step S6 if temperature Tehc is equal to or lower than the threshold value, the control proceeds to Step S10. In Step S10, ECU 150 sets the electric power energizing the EHC as the upper limit electric power for energization Wout that can be output from power storage device 70. ECU 150 exerts control by control signal S5 so that EHC power supply 100 supplies EHC 140 with electric power Wout. In doing so, voltage Vehc and electric current Iehc may both be sensed and voltage may be controlled through feedback to cause a product of voltage Vehc and electric current Iehc to match Wout. Furthermore, the FIG. 4 characteristic allows resistance Rehc to be estimated from temperature Tehc simply by sensing voltage Vehc, i.e., or without sensing a current, and the electric power can be obtained from an equation of $P=V^2/R$.

If in step S6 temperature Tehc is not equal to or lower than the threshold value, the control proceeds to Step S7. In this case, temperature is high and the resistance of insulating member 420 is decreased, and it is not preferable to apply a high voltage exceeding 60 V. Accordingly in Step S7 Vehc is determined for example to be 60 V, 50 V or the like, and in Step S8 resistance Rehc is estimated from current temperature Tehc with reference to the FIG. 4 characteristic and then in Step S9 electric power for energization is determined therefrom.

If electric power for energization is determined in Step S9 or Step S10, then in Step S11 EHC power supply 100 is used to energize EHC 140 and in Step S12 the control returns to the main routine.

Figure 6:
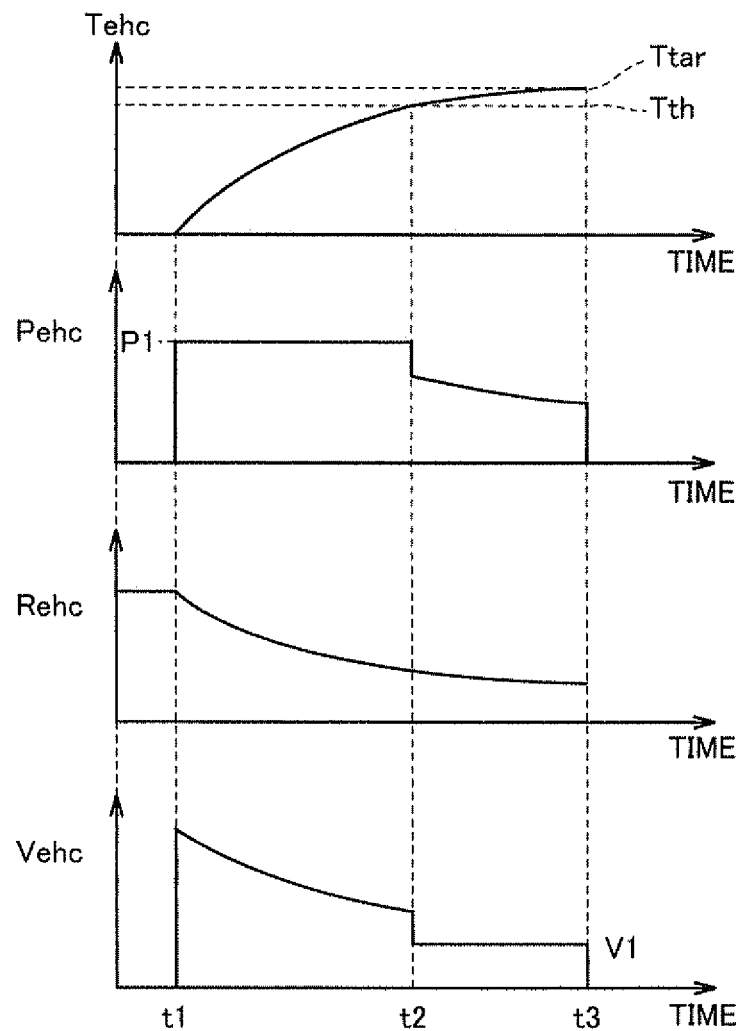
FIG. 6 is a waveform diagram showing an example of controlling energization when the EHC is heated.

FIG. 6 is a waveform diagram showing an example of controlling energization when the EHC is heated.

With reference to FIG. 1 and FIG. 6, the axis of abscissa represents time, and the axis of ordinate represents EHC temperature Tehc, EHC electric power Pehc, EHC resistance Rehc, and EHC voltage Vehc, as seen from the top to the bottom.

Initially, energizing the EHC starts at time t1. Temperature Tehc has not yet reached threshold temperature Tth for times t1-t2. For this period, insulating member 420 of FIG. 2 has a sufficiently large value in resistance, and a high voltage exceeding 60 V, e.g., 200 V, may be applied. However, the upper limit electric power that power storage device 70 can supply varies with temperature TB, the SOC of power storage device 70 and the like, as occasion arises, and accordingly, electric power P1 determined therefrom is applied.

For times t1-t2, temperature rises and accordingly the EHC carrier 430 resistance Rehc also gradually decreases, and voltage Vehc is also controlled so that electric power Pehc may not increase, and voltage Vehc also gradually decreases.

At time t2, temperature Tehc reaches threshold temperature Tth, and accordingly, ECU 150 switches controlling electric power to be constant to controlling voltage to be constant. The EHC receives voltage V1, which is set to be a constant voltage for example of 60 V, 50 V or the like. Note that voltage Vehc may not be constant voltage, and the temperature uniquely corresponding to the EHC's temperature Tehc may be determined in a map and applied.

For times t2-t3, temperature Tehc approaches a target temperature Ttar more slowly than it does for times t1-t2. When temperature reaches target temperature Ttar, the engine is started. Thereafter, the EHC is energized to such an extent that temperature does not fall.

Thus in the present embodiment when the EHC's temperature exceeds a threshold temperature (e.g., 400° C.), electric power for energization, voltage and/or the like can be limited and voltage to be applied can be reduced to reduce a possibility that an insulating member will cause dielectric breakdown. Furthermore, before the EHC's temperature reaches the threshold value, electric power up to an upper limit can be applied to the EHC and thus heat the EHC rapidly.

Finally, reference will again be made to FIG. 1 to summarize the present embodiment.

With reference to FIG. 1, vehicle 1 includes engine 10, EHC 140 configured to be electrically heatable for purifying the exhaust gas of engine 10, temperature sensor 125 for sensing the temperature of EHC 140, power storage device 70, a state-of-charge detection unit (120, 121) for detecting a state of charge of power storage device 70, temperature sensor 126 for sensing the temperature of power storage device 70, EHC power supply 100 receiving electric power from power storage device 70 and supplying EHC 140 with electric power for heating it, and ECU 150 controlling EHC power supply 100. ECU 150 calculates first electric power (Wout) that power storage device 70 can supply based on the state of charge of power storage device 70 and an output of temperature sensor 126, and ECU 150 determines according to an output of temperature sensor 125 whether to cause EHC power supply 100 to supply EHC 140 with the first electric power (Wout).

Preferably, as shown in the FIG. 5 steps S6 and S10 and indicated in FIG. 6 for times t1-t2, if temperature sensor 125 senses that EHC 140 has temperature Tehc lower than threshold temperature Tth, ECU 150 causes EHC power supply 100 to supply EHC 140 with the first electric power (P1=Wout). Furthermore, as shown in the FIG. 5 Steps S6-S9, if EHC 140 has temperature Tehc higher than threshold temperature Tth, ECU 150 causes EHC power supply 100 to supply EHC 140 with voltage V1 that can ensure the insulation of insulating member 420 holding EHC carrier 430 of FIG. 2, and electric power limited to be smaller than the first electric power (P1=Wout).

More preferably, as shown in the FIG. 5 step S7 and indicated in FIG. 6 for times t2-t3, if EHC 140 has temperature higher than threshold temperature Tth, ECU 150 causes EHC power supply 100 to supply EHC 140 with voltage V1 equal to or smaller than a predetermined value.

As shown in FIG. 6, preferably, after starting to heat EHC 140 while temperature sensor 125 senses that EHC 140 has temperature Tehc lower than threshold temperature Tth (i.e., for times t1-t2) ECU 150 controls EHC power supply 100 to supply EHC 140 with target electric power P1, and once EHC 140 has attained temperature exceeding the threshold value (i.e., for times t2-t3) ECU 150 controls EHC power supply 100 to supply EHC 140 with target voltage V1.

Preferably, as shown in FIG. 2, EHC 140 includes EHC carrier 430 energized to generate heat. As shown in the FIG. 5 Steps S8 and S9, ECU 150 estimates a value in resistance of EHC carrier 430 from an output of temperature sensor 125 and determines electric power output from power storage device 70 for energization in accordance with the estimated value.

Preferably, as shown in FIG. 1, vehicle 1 further includes a motor (MG1 or MG2) for causing the vehicle to travel, and motor drive unit 75 for driving the motor (MG1 or MG2). Power storage device 70 supplies electric power to motor drive unit 75.

It should be understood that the embodiments and examples disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

1: vehicle; 10: engine; 40: power split device; 50: speed reducer; 60, 60-1, 60-2: inverter; 70: power storage device; 75: motor drive unit; 80: driving wheel; 90: voltage converter; 100: EHC power supply; 120: current sensor; 121: voltage sensor; 122, 123, 124: rotational speed sensor; 125, 125a, 125b, 126: temperature sensor; 130: exhaust path; 410: casing; 420: insulating member; 430: EHC carrier; 450: positive electrode; 470: negative electrode; 460, 480: electrode coating; C1: smoothing capacitor; GL0, GL1: ground line; MG1, MG2: motor generator; PL0, PL1: power supply line.

The invention claimed is:

1. A vehicle comprising:
   an internal combustion engine;
   a catalyst device configured to be electrically heatable for purifying exhaust gas of said internal combustion engine;
   a first temperature detection unit for detecting a temperature of said catalyst device;
   a power storage device;
   a state-of-charge detection unit for detecting a state of charge of said power storage device;
   a second temperature detection unit for detecting a temperature of said power storage device;
   a catalyst power supply device receiving electric power from said power storage device and supplying said catalyst device with electric power for heating said catalyst device; and
   an electronic control unit having control logic configured to cause the electronic control unit to:
      calculate a first electric power that said power storage device can supply based on said state of charge of said power storage device and an output of said second temperature detection unit; and
      determine, according to an output of said first temperature detection unit, whether to cause said catalyst power supply device to supply said catalyst device with said first electric power, wherein
   if said first temperature detection unit detects that said catalyst device has temperature lower than a threshold value, the electronic control unit causes said catalyst power supply device to supply said catalyst device with said first electric power, and
   if said catalyst device has temperature higher than said threshold value, the electronic control unit causes said catalyst power supply device to supply said catalyst device with a voltage that can ensure insulation of an insulator holding said catalyst device, and electric power limited to be smaller than said first electric power.

2. The vehicle according to claim 1, wherein if said catalyst device has temperature higher than said threshold value, the electronic control unit causes said catalyst power supply device to supply said catalyst device with a voltage equal to or smaller than a predetermined value.

3. The vehicle according to claim 1, wherein after starting to heat said catalyst device while said first temperature detection unit detects that said catalyst device has temperature lower than a threshold value, the electronic control unit controls said catalyst power supply device to supply said catalyst device with target electric power, and once said catalyst device has attained temperature exceeding said threshold value, the electronic control unit controls said catalyst power supply device to supply said catalyst device with target voltage.

4. The vehicle according to claim 1, wherein:
said catalyst device includes a heating element energized to generate heat; and
the electronic control unit estimates a value in resistance of said heating element from an output of said first temperature detection unit and determines electric power output from said power storage device for energization in accordance with said value estimated.

5. The vehicle according to claim 1, further comprising:
a motor for causing the vehicle to travel; and
a motor drive unit for driving said motor, wherein said power storage device supplies electric power to said motor drive unit.

6. A method for energizing a catalyst device configured to be electrically heatable by electric power received from a power storage device for purifying exhaust gas of an internal combustion engine of a vehicle, comprising the steps of:
detecting a temperature of said catalyst device;
detecting a state of charge of said power storage device;
detecting a temperature of said power storage device;
calculating a first electric power that said power storage device can supply based on said state of charge of said power storage device and said temperature of said power storage device; and
determining whether to allow said power storage device to supply said catalyst device with said first electric power according to said temperature of said catalyst device; wherein
if said temperature of said catalyst device detected is lower than a threshold value, causing said catalyst power supply device to supply said catalyst device with said first electric power;
if said temperature of said catalyst device detected is higher than said threshold value, causing said catalyst power supply device to supply said catalyst device with a voltage that can ensure insulation of an insulator holding said catalyst device, and electric power limited to be smaller than said first electric power; and
the steps of calculating, determining and causing are carried out by an electronic control unit having control logic configured to cause the electronic control unit to perform the steps.

* * * * *